United States Patent [19]
Kobold

[11] Patent Number: 5,099,699
[45] Date of Patent: Mar. 31, 1992

[54] FLOW INDICATOR OR FLOWMETER

[76] Inventor: Klaus Kobold, Nordring 22-24, 6238 Hofheim/Taunus, Fed. Rep. of Germany

[21] Appl. No.: 492,327

[22] Filed: Mar. 12, 1990

Related U.S. Application Data

[63] Continuation-in-part of Ser. No. 254,689, Oct. 7, 1988, abandoned.

[30] Foreign Application Priority Data

Oct. 7, 1987 [DE] Fed. Rep. of Germany ....... 3733862

[51] Int. Cl.$^5$ ............................................. G01F 1/06
[52] U.S. Cl. ................. 73/861.79; 73/861.87
[58] Field of Search ............... 73/253, 861.77, 861.70, 73/861.79, 861.87, 861.88

[56] References Cited

U.S. PATENT DOCUMENTS

| | | | |
|---|---|---|---|
| 4,023,410 | 5/1977 | Althaus | 73/861.87 |
| 4,172,381 | 10/1979 | Aigner | 73/861.87 |
| 4,260,637 | 6/1980 | Pankonien | 73/187 |
| 4,379,411 | 4/1983 | Laviano et al. | 73/861.87 |
| 4,534,227 | 8/1985 | Petit | 73/253 |
| 4,548,084 | 10/1985 | Onoda et al. | 73/861.87 |

Primary Examiner—Herbert Goldstein
Attorney, Agent, or Firm—Wenderoth, Lind & Ponack

[57] ABSTRACT

A flow indicator or flowmeter is provided with an impeller which is rotatably mounted in an essentially circular-cylindrical flow chamber of a flow housing which has an inlet channel and an outlet channel. The impeller has an odd number of blades and is visible through a transparent side wall so that rotation of the impeller can be viewed to indicate fluid flow. The impeller can have magnets, ferrite cores or similar impulse creating elements by means of which an electronic circuit is actuated so that the device serves not only as a flow indicator but also as a flowmeter. It is also preferred that the inlet and outlet channels be orientated obliquely relative to a radial direction of the flow chamber such that the fluid impinges on side faces of the impeller blades.

26 Claims, 5 Drawing Sheets

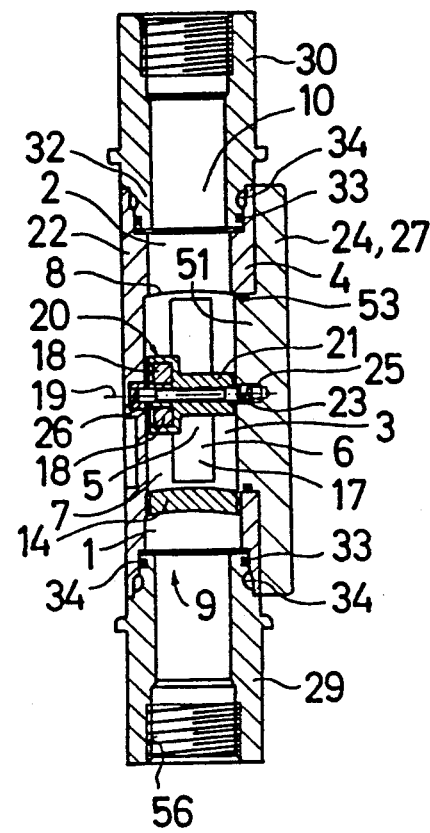
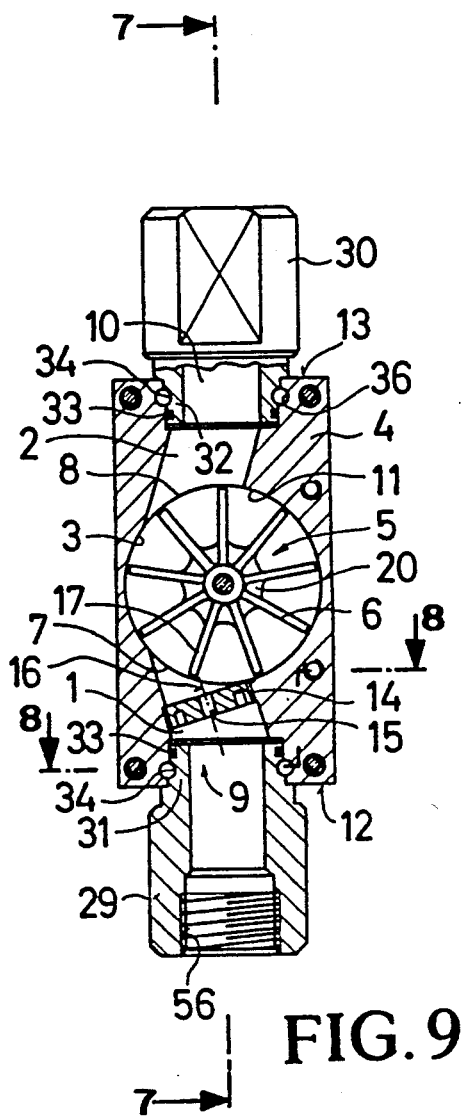
FIG. 9    FIG. 7
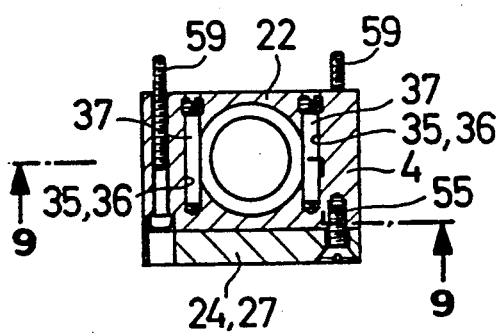
FIG. 8

FLOW INDICATOR OR FLOWMETER

This application is a continuation-in-part of now abandoned application, Ser. No. 07/254,689 filed on Oct. 7, 1988.

BACKGROUND OF THE INVENTION

The relates to a flow indicator or flowmeter with an impeller rotatably mounted in an essentially circular-cylindrical flow chamber of a flow housing which has an inlet channel and an outlet channel.

Flow indicators or flowmeters of this type are known. They yield a direct indication of flow in that the impeller, which rotates with the flow, is visible from the side, or they serve as flowmeters, counters and metering devices in that the impeller is equipped with alternately polarized magnets at the ends of the impeller blades. The magnets trigger voltage impulses in a fixed position pick-up coil. These electric impulses can be amplified and counted in an electronic circuit, from which the quantity of flow (or flow rate) is determined and displayed on a display panel by means of light-emitting diodes in units of, for example, liters or liters per minute. Such impeller flow indicators or meters have, for example, with respect to some floating member flow meters, the advantage of almost viscosity-independent indication or measurement results. However, the period for which this type of existing device will operate reliably is relatively limited, and as a flowmeter which requires a housing for the electric circuit, this kind of device requires significant space. Furthermore, its flow resistance is relatively large since the inlet channel and the outlet channel are in one and the same side wall.

SUMMARY OF THE INVENTION

An object of the present invention is to design a flow indicator or flowmeter of the aforementioned type in such a manner that it remains completely functional for long operating periods and accurately provides a wide range of measurements.

In known flow indicators, which are equipped with magnets of alternating polarity mounted to the blades of the impeller, an even number of blades is required. This can lead to undesired resonances and starting difficulties for the impeller. The resonances result in a significant load on the bearing of the impeller, which is further increased by the fact that the magnet-induced inert mass of the impeller is at a relatively large radial distance from the axis of rotation.

The problem is essentially solved by the invention in that the impeller has an odd number of blades.

In order to further reduce the flow resistance of the new device, the peripheral distance between the center point of the inlet opening of the inlet channel of the flow chamber and the center point of the outlet opening of the outlet channel of the flow chamber are preferably spaced apart circumferentially by about 180° or less, preferably between 180° and 160°.

Thus in another feature of the invention, the inlet channel and the outlet channel are fluidically connected with the housing openings formed in opposing faces of the flow housing.

Starting difficulties of the impeller can be avoided if at least one inlet channel extends obliquely relative to the radial direction of the flow chamber, preferably at an angle less then between 10° and 80° such that flow from the inlet channel will be certain to impinge on a side face of at least one impeller blade, despite the compact construction of the flow housing.

Even the outlet channel can extend from the cover of the flow chamber obliquely relative to the radial direction of the flow chamber, preferably at an angle of less than between 10° and 80°. With this design, the fluid to be measured can be fed through the flow chamber starting from either side (i.e. from inlet channel to outlet channel or from outlet channel to inlet channel) side, depending on the space requirements.

In order to obtain favorable flow conditions, it is also proposed with respect to the invention that the openings of the housing for the inlets channel and/or outlet channel be in the center of the opposing faces of the flow housing.

A high accuracy measurement for a wide range of measurements can be obtained, if, according to another feature of the invention, a nozzle plate, having a nozzle hole of a pre-determined diameter is inserted, e.g. screwed, into the inlet channel and/or the outlet channel. Thus the nozzle plate can be exchanged in a simple manner for another nozzle plate having a nozzle hole of different diameter.

In particular, where D is the nozzle hole diameter and $R_1$ is the lower limit of the range of flow rates to be measured, it has been found that higher accuracy in the measurement of flow may be achieved by increasing both the nozzle hole diameter and the value of the ratio $V = R_1/D$ as the lower limit of the range of flow rates to be measured is increased. Thus, when the flow rate of the fluid medium to be measured has a lower limit which is relatively low, the diameter of the nozzle hole is relatively small. On the other hand, when the lower limit of the expected range of flow rates is relatively high, or at least not extremely low, the nozzle hole diameter may be larger.

More specifically, for fluid medium flow rates having a lowest expected value of approximately 0.025 GPM (gal/min.), a nozzle hole diameter of approximately 0.05 in. is used, and extremely good results in accuracy of measurement are thereby achieved. On the other hand, when the lowest expected flow rate is approximately 1.5 GPM, a nozzle hole diameter of 0.75 in. is used to achieve accuracy of measurement.

The flow direction, determined by the orientation of the central longitudinal axis of the nozzle hole in the nozzle plate is independent of the direction of the central longitudinal axis of the inlet channel, and can be oblique relative to the radial direction of the flow chamber, preferably at an angle of less than between 10° and 80°. Such oblique orientation assures the starting of the impeller.

Alternatively, the central longitudinal axes of the inlet channel and the nozzle hole can extend toward the side faces of the radially outer end sections of the impeller blades of the impeller in order to exert a torque on the impeller.

The blades of the impeller can be perforated radially within the radially outer end sections of the blades so as to reduce the mass of the impeller and the resistance to rotation of the impeller within a filled flow chamber.

The distance between the radially outer end sections of the blades of the impeller and the cover of the flow chamber is as small as possible (less than a millimeter and preferably less than 0.5 mm) so that the blades provide a seal between themselves and the walls of the flow chamber. This minimizes the leakage so that the accuracy of counting and measuring is increased.

So that the present invention can be used not only as a flow indicator but also as a flowmeter, the impeller has a number of peripherally spaced magnets, ferrite cores or similar impulse-creating elements of the invention are preferably mounted near the axis of the impeller. This significantly reduces the moment of inertia of the impeller. The bearings thus have less of a load imposed thereon. In addition to this, there are no magnets in the blades themselves, or even their ends, so that despite the odd number of blades, an even number of magnets with alternating polarity to interact with a fixed Hall probe, or ferrite cores to interact with a fixed coil, can be provided.

The impulse-creating elements are preferably joined together by a sector plate such that one impulse-creating element is arranged in each sector.

The sector plate can be a part of the hub of the impeller or be separate but fixed to the hub.

Furthermore, it is advantageous for the impulse-creating elements to be near a flat side wall of the flow housing, in particular near that side wall behind which the Hall probe, the coil or a proximity sensor for generating electrical impulses is provided. In this manner relatively large electric impulses are obtained.

Of course, the impeller can be mounted on a fixed shaft. However, this requires adequate lubrication. It is advantageous for the impeller of the invention to be fixedly mounted on a shaft which is rotatably mounted in the two opposing flat side walls of the flow housing.

According to another feature of the invention, the bearing for the shaft is formed by two bearing elements, one of which is axially mounted in a fixed position in one side wall and the other of which is mounted such that it is axially adjustable, preferably from the outside, in the other side wall. In this manner the impeller can be quickly and safely assembled, and long-term functionability is assured.

Simple assembly is also facilitated if at least one of the flat side walls of the flow housing is formed at least partially by a removable, fastened housing cover, as is already known.

At least one of the flat side walls, which are parallel to the impeller and preferably receive the bearing elements for the impeller, or at least one of the housing covers, which have the same position and function, is made of a transparent material so that rotation of the impeller due to fluid flow is visible from the outside and so that a flow indication is given without an electronic circuit. If both side walls or housing covers are transparent, it can be optically determined from both sides whether or not there is a flow in the line within which the flow indicator is disposed.

The flow housing can be reliably sealed and easily assembled if the housing covers have projections which are adapted for engagement in recesses of the side walls and are radially sealed against the side walls by means of packing rings.

The flow housing of the invention can have connecting sleeves for the inlet channel and/or the outlet channel, so as to permit a pipe connection via either a thread connection or a flange connection. In particular, where D is nozzle hole diameter and $R_1$ is the lower limit of the range of flow rates to be measured, it has been found that higher accuracy in the measurement of flow may be achieved by increasing the value of the ratio $V = R_1/D$ and increasing the nozzle hole diameter with an increase in the lower limit of the range of flow rates to be measured. Thus, when the flow rate of the fluid medium to be measured has a lower limit which is relatively low, the diameter of the nozzle hole is relatively small. On the other hand, when the lower limit of the expected range of flow rate is relatively high, or at least not extremely low, the nozzle hole diameter may be larger.

More specifically, for fluid medium flow rates having a lowest expected value of approximately 0.025 GPM (gal/min.), a nozzle hole diameter of approximately 0.05 in. is used, and extremely good results in accuracy of measurement are thereby achieved. On the other hand, when the lowest expected flow rate is approximately 1.5 GPM, a nozzle hole diameter of 0.75 in. is used to achieve accuracy of measurement. In order to permit a simple installation of a pipe connection via a thread connection, the connecting sleeve, equipped with internal threads for example at its outer end, is inserted into a threadless hole of the inlet channel or outlet channel to form a seal with a socket end by means of a packing ring and the socket end has a groove with a round bottom to form a keyseat, opposite which is a matching groove in the threadless hole, formed by a section of at least one outwardly accessible hole of the housing. A locking pin, designed, for example, as a threaded pin, is inserted into the respective hole of the housing. In this manner the connecting sleeves cannot be axially displaced, yet they can rotate relative to the flow housing, thus producing a simple connection. Even when operating the device, the connecting sleeves can be moved relative to the flow housing, without having a negative impact on the seal of the connecting sleeves. In this manner another structural and functional advantage is obtained.

In order to obtain as compact a device as possible, the flow housing is adapted to fit into a recess of a housing of a device designed to receive the electronic circuit.

The outer configuration of the flow housing is preferably designed essentially with a cuboid shape, and in positioning the flow housing in the housing of the device, the free outer surfaces of the flow housing are preferably aligned with the adjacent outer surfaces of the housing of the device. Thus a complete compact device with overlapping outer surfaces is created. If the invention is to be used only as a flow indicator, the flow housing with the impeller and the connecting sleeves can be used alone. If, however, the invention is also to serve as a flowmeter, it is integrated into the housing of the device. This integration can also be achieved later (e.g. can be manufactured in the form of a kit). In this manner the quantity of flow can be measured by a purely visual display of the flow or by means of magnets, ferrites or similar impulse-creating elements, and an electronic circuit and a display by means of light-emitting diodes and/or digital signals when the invention is integrated with the device.

When the flow housing is integrated into the housing of the device, it is proposed that, in particular, the outer surface of the one flat side wall of the flow housing align with the front outer surface of the housing of the device. The flat side wall in question of the flow housing or the housing cover forming it are preferably made of transparent material so that the device can be used not only for measuring quantity of flow, but also for mere visual display of flow.

Since electronic circuits should not be subjected to temperatures above 100°, but the fluid to be measured may have higher temperatures, it is also proposed that when the flow housing is integrated into the housing of the device, the flow housing be thermally insulated with respect to the housing of the device, for example by means of an intermediate layer of thermally insulating panels.

In order to be able to modify the invention to provide varying ranges of measurement, the front outer surface of the housing of the device can be equipped with an exchangeable graduated plate.

The fact that the housing of the device is designed as a hollow extrusion provides for simple manufacture and assembly of the device.

In order to minimize the possibility of exceeding the maximum temperature in the housing of the device, the outer surfaces of the housing of the device can be profiled, e.g. shaped with ribs or grooves. These grooves should extend in the longitudinal direction of the extrusion, so that the individual housings of the devices can be cut off during continuous hollow extrusion.

BRIEF DESCRIPTION OF THE DRAWINGS

FIG. 7 is a vertical section along line 7—7 of FIG. 9 embodiment.

FIG. 8 is a horizontal section along line 8—8 of FIG. 9 of the device according to FIG. 1.

FIG. 9 is a vertical section along line 9—9 of FIG. 8 of the device according to FIG. 7.

DETAILED DESCRIPTION OF THE INVENTION

Figure 3:
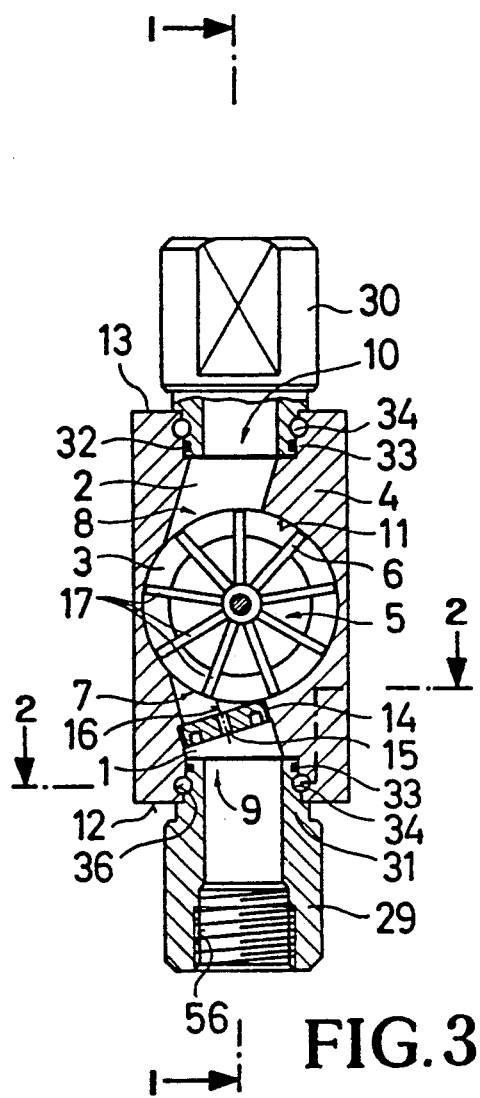
FIG. 3 is a vertical section along line 3—3 of FIG. 2 of the device of FIG. 1.
Figure 1:
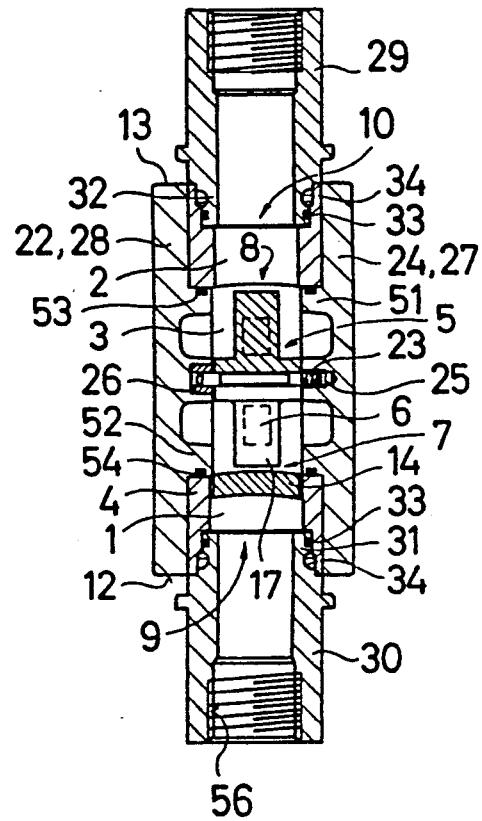
FIG. 1 is a vertical section along line 1—1 of FIG. 3 of an embodiment of the invention.
Figure 2:
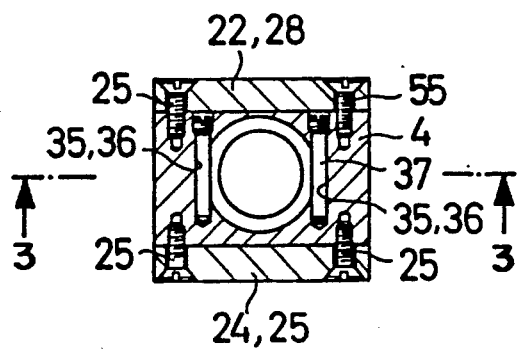
FIG. 2 is a horizontal section along line 2—2 of FIG. 3 of the device of FIG. 1.

FIGS. 1-3 illustrate a flow indicator according to the invention, comprising a flow housing 4 with an essentially circular-cylindrical flow chamber 3 in which an impeller 5 can rotate. The flow chamber 3 is equipped with an inlet channel 1 and an outlet channel 2. The peripheral distance between the center point of an inlet opening 7 of the inlet channel 1 and the center point of an outlet opening 8 of the outlet channel 2 is less than 180°. Inlet channel 1 and outlet channel 2 are fluidically connected respectively with external openings 9, 10 which are arranged on opposing faces 12, 13 of the flow housing 4. The openings 9, 10 are arranged in the middle of the opposing faces (first and second external faces) 12, 13 of the flow housing 4 such that the external opening 9 of the inlet channel 1 is diametrically opposed to the external opening 10 of the outlet channel 2 with respect to the flow chamber 3. From the opening 9 of the housing, the inlet channel 1 extends obliquely relative to the radial direction of the flow chamber 3 from the inlet opening 7 of the flow chamber 3.

The outlet channel 2 also extends obliquely relative to the radial direction of the flow chamber 3 away from the outlet opening 8 of the flow chamber 3. A nozzle plate 14, which has a nozzle hole 15 of a pre-determined diameter, is screwed into the inlet channel 1, which is equipped with an internal thread. The nozzle plate 14 is provided with two external engaging openings for a lathe tool. A central longitudinal axis 16 of the nozzle hole 15, like that of the inlet channel 1, orientated such that flow through the nozzle hole 15 is focused on side faces of radially outer end sections 17 of blades 6 of the impeller 5 as the blades travel past the inlet opening 7. The blades 6 of the impeller 5 can also be perforated. The distance between the radially outer end sections 17 of the blades 6 of the impeller 5 from an inner circumferential wall 11 of the flow chamber 3 is as small as possible so that fluid leakage is minimized.

The mounting of the nozzle plate 14 in the inlet channel 1 and/or outlet channel 2 allows the nozzle plate 14 to be removed and replaced with a different nozzle plate 14 having a nozzle hole 15 of a different pre-determined diameter. This is extremely advantageous, as it has been found that the accuracy of the measurement of the flow rate is improved by employing the proper sized nozzle hole 15. Where the expected range of flow rates has a lower limit $R_1$, and the nozzle hole 15 has a diameter D, both the nozzle hole diameter D and the value of the ratio $V = R_1/D$ should be increased as the value for $R_1$ is increased. Typical values for and V are provided in the table below.

| D (inches) | V (GPM/inches) |
|---|---|
| 0.05 | approx. 0.5 |
| 0.075 | approx. 0.6 |
| 0.10 | approx. 1.0 |
| 0.30 | approx. 1.4 |
| 0.50 | approx. 1.5 |
| 0.60 | approx. 1.7 |
| 0.75 | approx. 2.0 |

The impeller 5 is fixed to a shaft 23, which is rotatably supported by two opposing flat side walls 22, 24 of the flow housing 4. A bearing for the shaft 23 is formed by bearing elements 25, 26. Bearing element 26 is axially mounted in a fixed position in one side wall 22 and bearing element 25 is axially adjustably mounted in the other side wall 24 such that it can be adjusted from the outside. Both flat sidewalls 22, 24 of the flow housing 4 are formed by removable housing covers 27, 28, which are fastened by means of screws 55. The housing covers 27, 28 can be made of transparent material. The housing covers 27, 28 include projections 51, 52, which receive the bearing elements 25, 26 for the shaft 23 of the impeller 5. The projections 51, 52 are sealed radially against the flow housing 4 by means of packing rings 53, 54.

Inlet channel 1 and outlet channel 2 have connecting sleeves 29, 30. The connecting sleeves 30, 29 are inserted into a threadless hole of the inlet channel 1 and outlet channel 2, respectively, such that a seal is formed between sleeve sections 31, 32 and the flow housing 4 by means of packing rings 33. Each of the respective sleeve sections 31, 32 has a groove 34 with a round bottom to form a keyseat, opposite which are two matching grooves 36 formed in the threadless holes of the inlet channel 1 and the outlet channel 2, the grooves 36 each being formed by one section of each of two holes 35 of the housing that are accessible from the outside. One locking pin 37, which is designed as a threaded pin, is inserted into each hole 35 of the housing. In this manner the connecting sleeves 29, 30 are axially positioned, yet they can be rotated with respect to the flow housing 4. Each of the inlet channel 1 and outlet channel 2 is provided with internal threads 56 for connection with an externally threaded pipe joint.

Figure 6:
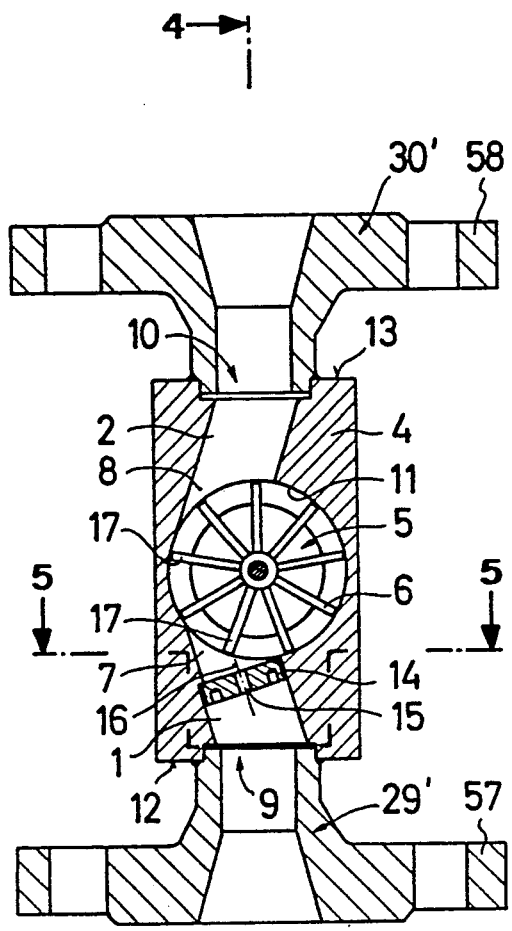
FIG. 6 is a vertical section along line 6—6 of FIG. 5 of the device according to FIG. 4.
Figure 4:
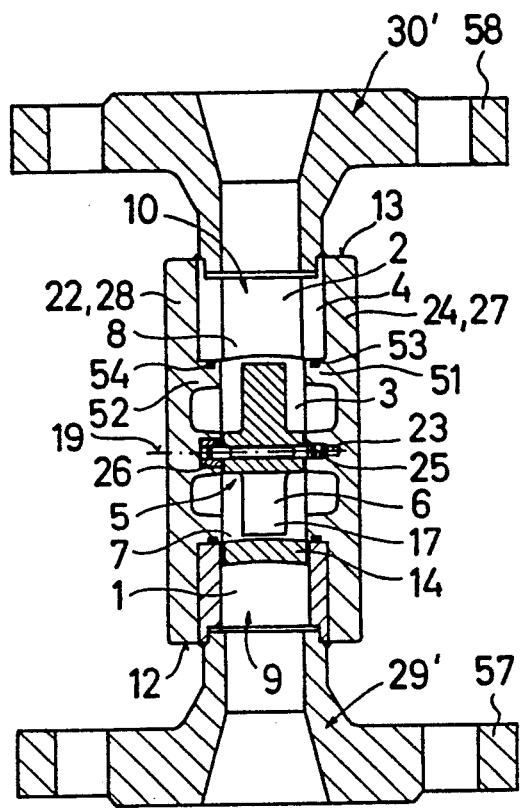
FIG. 4 is a transverse section of another embodiment along section line 4—4 of FIG. 6.
Figure 5:
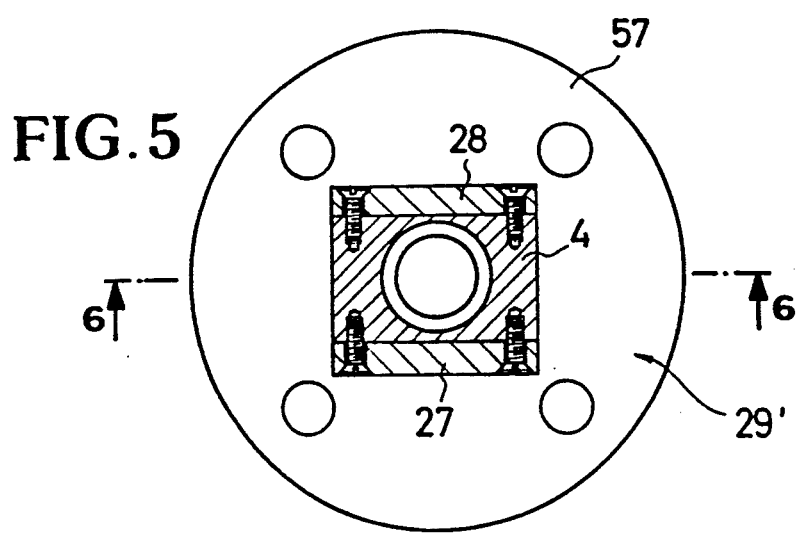
FIG. 5 is a horizontal section along line 5—5 of FIG. 6 of the device according to FIG. 4.

A difference between the flow indicator of the invention, according to FIGS. 4-6, and that shown in FIGS. 1-3 is that connecting sleeves 29', 30' for inlet channel 1 and outlet channel 2 do not have the internal threads 56, but rather include flanges 57, 58 for connection with complementary flanges. In addition, the connecting sleeves 29', 30' are welded to the flow housing 4.

The embodiment of the device shown in FIGS. 7-9 is similar to that of FIGS. 1-3. However, in FIGS. 7-9 the device is equipped as a flowmeter, which offers not only an optical flow indication due to the transparent material of the housing cover 27 (the housing cover 28 is missing here) but also an electric measurement indicator for the quantity of flow. The mounting of the nozzle plate 14 in the inlet channel 1 and/or outlet channel 2 allows the nozzle plate 14 to be removed and replaced with a different nozzle plate 14 having a nozzle hole 15 of a different pre-determined diameter. This is extremely advantageous, as it has been found that the accuracy of the measurement of the flow rate is improved by employing the proper sized nozzle hole 15. Where the expected range of flow rate has a lower limit $R_1$, and the nozzle hole 15 has a diameter D the value of the ratio $V = R_1/D$ and the value for D should both increase with an increase in the value for $R_1$. Typical values for D and V are provided in the table below.

| D (inches) | V (GPM/inches) |
| --- | --- |
| 0.05 | approx. 0.5 |
| 0.075 | approx. 0.6 |
| 0.10 | approx. 1.0 |
| 0.30 | approx. 1.4 |
| 0.50 | approx. 1.5 |
| 0.60 | approx. 1.7 |
| 0.75 | approx. 2.0 |

For this purpose the impeller 5 has a number of peripherally spaced magnets, ferrite cores or similar impulse-creating elements 18, which are combined and enclosed in the immediate vicinity of the axis 19 of the impeller 5 in a sector plate 20, which is made e.g. of plastic, such that an impulse-creating element 18 is provided for each sector (i.e. corresponding to each blade 6) of the impellers. The sector plate 20 forms a part of a hub 21 of the impeller 5. The impulse-creating elements 18 are mounted near the flat side wall 22 of the flow housing 4, on whose outside is mounted a Hall generator (not illustrated), a coil (not illustrated), or a proximity circuit element (not illustrated), to generate an electric voltage or current signal. The flow housing 4 can be positioned in a recess 38 of a housing 39 of a device by means of screws 59, as shown in FIGS. 8 and 13.

Figures 10, 12:
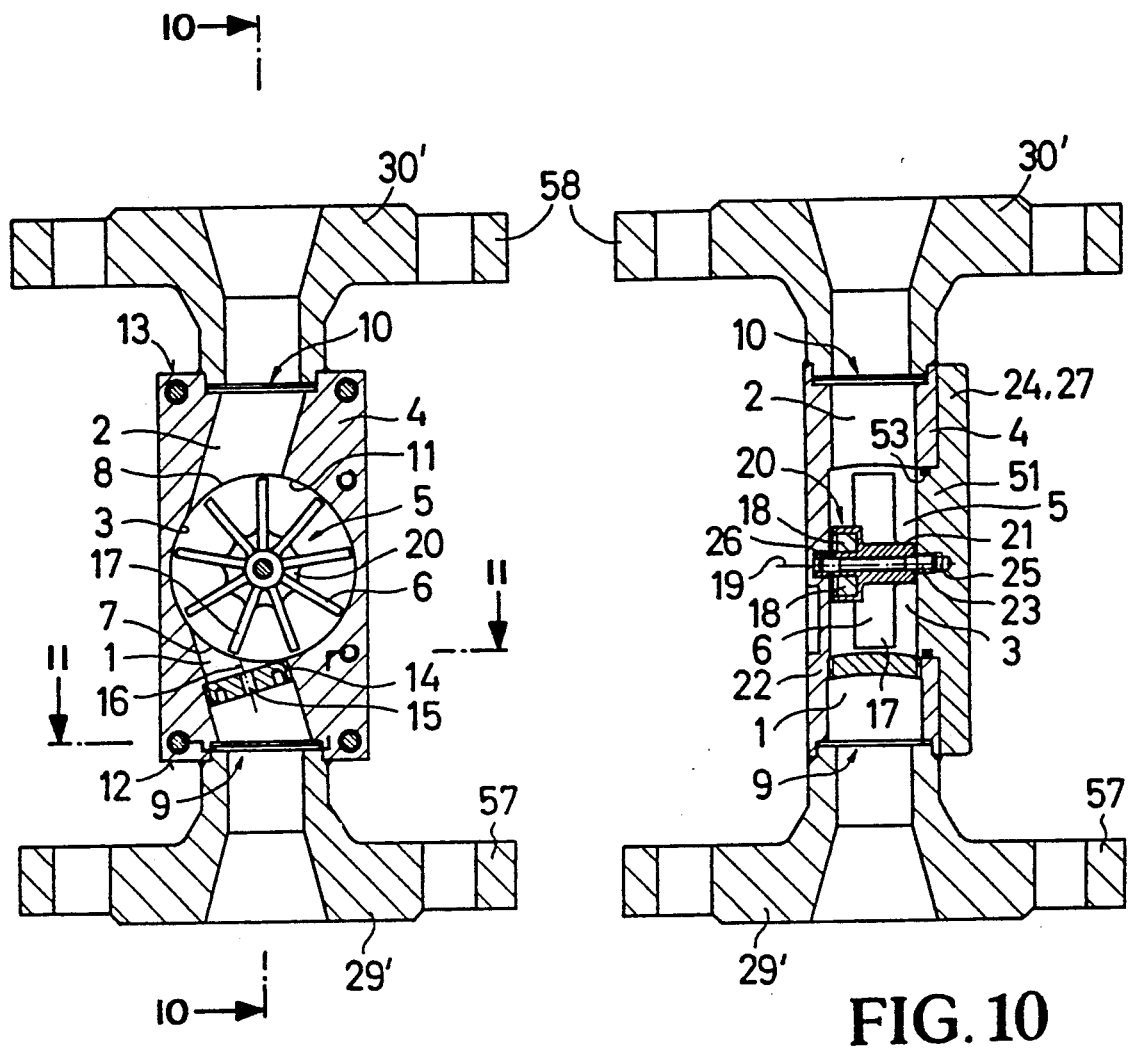
FIG. 10 is a vertical section along line 10—10 of FIG. of another embodiment of the invention.
FIG. 12 is a vertical section along line 12—12 of FIG. 11 of the device according to FIG. 10.
Figure 11:
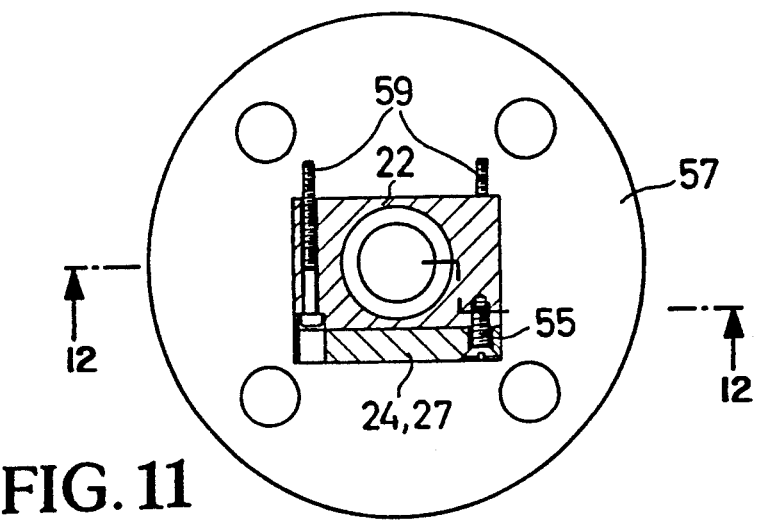
FIG. 11 is a horizontal section along line 11—11 of FIG. 12 of the device according to FIG. 10.

The embodiment of the invention shown in FIGS. 10-12 corresponds essentially to that of FIGS. 7-9. However, here again rather than having internally threaded connecting sleeves 29, 30 flanged connecting sleeves 29' and 30' are provided and are welded to the flow housing 4 in a manner similar to the embodiment of FIGS. 4-6. Otherwise, the construction is identical to that shown in FIGS. 7-9.

Figure 13:
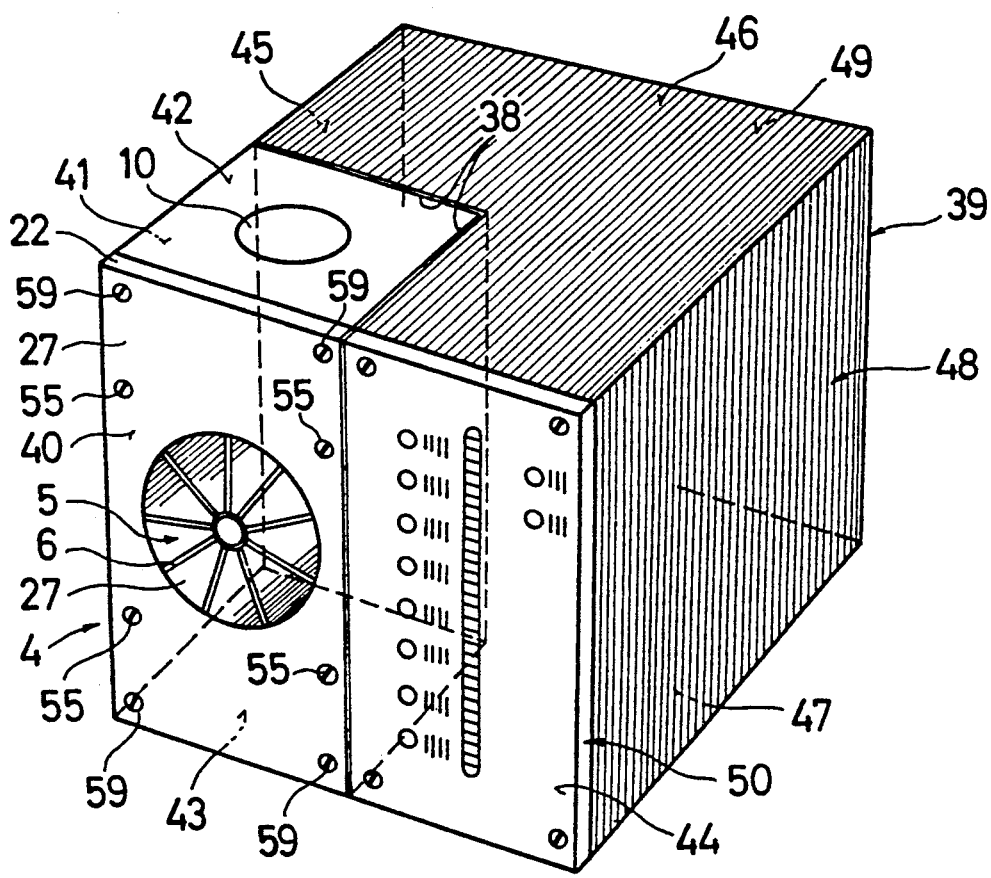
FIG. 13 is a perspective view of a flow indicator or flowmeter inserted into a recess of a housing of a device.

FIG. 13 is a perspective view of a device which incorporates the present invention. In this device, the flow housing 4 is fitted into the recess 38 of the housing 39 of the device in a compact manner. The connecting sleeves 29, 30 or 29', 30' are not shown in FIG. 13. The housing cover 27 is made of a transparent material so that the device can be used not only as a flow indicator but also as a flow meter with the aid of an electronic circuit housed in the housing of the device 39. The recess 38 of the housing 39 of the device is designed as a cuboid to correspond to the outer shape of the flow housing 4 in such a manner that free outer surfaces 40-43 of the flow housing 4 align with adjacent outer surfaces 44-48 of the housing 39 of the device. In particular, the outer surface 40 of the flat side wall 22 of the flow housing 4 aligns with the front outer surface 44 of the housing 39 of the device. The flow housing 4 is also thermally insulated with respect to the housing 39 of the device by placing thermal insulating panels between the flow housing 4 and the housing 39 of the device. The frontal outer surface 44 of the housing 39 is equipped with an exchangeable graduated plate 50, which indicates in analog or digitally the quantity of flow, e.g. by means of light-emitting diodes. In this case, additional functions such as indicating when a given threshold value has been reached or exceeded, and indicating the operating state (on/off) of the device. The signal range (in mA) can also be indicated, and actuating members to adjust the range of measurement and the like can be provided.

The housing 39 of the device is designed as a hollow extrusion with its outer surfaces 40-49 profiled, e.g. with ribs or grooves which extend in the longitudinal direction of the hollow extrusion so as to radiate excess heat.

I claim:

1. A device for indicating flow of a fluid which flows at a rate within a range of flow rates having a flow rate $R_1$ as its lower limit, comprising:
   a flow housing having defined therein a substantially cylindrical flow chamber, an inlet channel and an outlet channel, both said inlet channel and said outlet channel being in fluid communication with said flow chamber such that the fluid can flow through said inlet channel, said flow chamber and said outlet channel;
   an impeller rotatably mounted within said flow chamber for rotation about a rotational axis; and
   at least one nozzle plate mounted respectively within at least one of said inlet and outlet channels, said at least one nozzle plate having a nozzle hole of a predetermined diameter D formed therein, the diameter of said nozzle hole being predetermined in dependence on a ration $V = R_1 D$, such that the higher the lower limit $R_1$, the higher the value of said ratio V, and the larger the predetermined diameter D, wherein the value of said ratio V is approximately 0.5 GPM/inch when the diameter D is approximately 0.05 inches and the value of said ratio V is approximately 2 GPM/inch when the diameter D is approximately 0.75 inches.

2. A device as recited in claim 1, wherein said impeller has an odd number of blades.

3. A device as recited in claim 1, wherein said inlet channel includes an inlet opening into said flow chamber, and said outlet channel includes an outlet opening into said flow chamber, said inlet opening being spaced circumferentially about a periphery of said flow chamber from said outlet opening by less than 180°.

4. A device as recited in claim 3, wherein
said inlet channel has an external opening from said flow housing through a first external face of said flow housing, and said outlet channel has an external opening from said flow housing through a second external face of said flow housing, said second external face being diametrically opposed to said first external face with respect to said flow chamber, and said external opening of said inlet channel being diametrically opposed to said external opening of said outlet channel with respect to said flow chamber.

5. A device as recited in claim 4, wherein
said impeller has a plurality of blades, each of which has a side face; and
a central longitudinal axis of said inlet opening extends obliquely relative to a radial direction of said flow chamber and a central longitudinal axis of said outlet opening extends obliquely relative to a radial direction of said flow chamber, such that fluid flowing into said fluid chamber impinges on said side faces of said blades of said impeller.

6. A device as recited in claim 5, wherein
said inlet and outlet channels are angled, respectively, by 10° to 80° relative to a radial direction of said flow chamber.

7. A device as recited in claim 5, wherein
said inlet opening is spaced circumferentially about the periphery of said flow chamber by 160° to 180° from said outlet opening.

8. A device as recited in claim 1, wherein
said at least one nozzle plate is detachably mounted by screw threads within said at least one of said inlet and outlet channels, respectively.

9. A device as recited in claim 1, further comprising
a plurality of impulse-creating elements mounted circumferentially about the rotational axis of said impeller in spaced apart relation adjacent said rotational axis.

10. A device as recited in claim 9, wherein
said plurality of impulse creating elements are mounted on a sector plate which is mounted for rotation with said impeller.

11. A device as recited in claim 1, wherein
said flow housing includes sidewalls spaced apart on axially opposing sides of said impeller.

12. A device as recited in claim 1, wherein
said flow housing includes a transparent cover on at least one side of said flow chamber.

13. A device as recited in claim 12, wherein
said cover is removably mounted to said flow housing.

14. A device as recited in claim 1, further comprising
connecting sleeve means mounted to each of said inlet and outlet channels for connecting the device into a fluid flow line.

15. A device as recited in claim 14, wherein
each of said connecting sleeve means has an external groove formed therein;
each of said inlet channel and said outlet channel has an internal groove therein alignable respectively with said external grooves of said connecting sleeve means; and
locking pins are provided for receipt in corresponding ones of said external and internal grooves when said corresponding external and internal grooves are mutually aligned to maintain said connecting sleeve means in said inlet and outlet channels, respectively.

16. A device as recited in claim 1, further comprising
a device housing having a recess formed therein, said flow housing being engaged in said recess of said device housing such that external faces of said flow housing align with corresponding external faces of said device housing to form a substantially cuboid-shaped structure.

17. A device as recited in claim 16, wherein
said device housing includes an exchangeable graduated plate on an external face thereof.

18. A device as recited in claim 17, wherein
said device housing comprises a hollow, profiled extrusion.

19. A device as recited in claim 18, wherein
said hollow, profiled extrusion has ribs formed therealong on the external faces thereof.

20. A device as recited in claim 1, wherein
said blades of said impeller are perforated.

21. A device as recited in claim 1, wherein
said impeller has a plurality of blades which extend radially outwardly to within one millimeter of an inner circumferential wall of said flow chamber.

22. A device as recited in claim 21, wherein
said blades extend radially outwardly within 0.5 millimeters of said inner circumferential wall of said flow chamber.

23. A device as recited in claim 1, wherein
said impeller is fixedly mounted to a shaft;
said flow housing includes sidewalls spaced apart on axially opposing sides of said impeller; and
said shaft is rotatably mounted to said spaced apart sidewalls.

24. A device as recited in claim 23, wherein
a fixed bearing element is mounted in one of said sidewalls;
an axially adjustable bearing element is mounted in the other of said sidewalls; and
said shaft is rotatably mounted in said fixed bearing and said adjustable bearing element.

25. A device as recited in claim 1, wherein
the value of said ratio V is approximately 0.6 GPM/inch when the diameter D is approximately 0.075 inches, the value of said ratio V is approximately 1.0 GPM/inch when the diameter D is approximately 0.10 inches, the value of said ratio V is approximately 1.4 GPM/inch when the diameter D is approximately 0.30 inches, the value of said ratio V is approximately 1.5 GPM/inch when the diameter D is approximately 0.50 inches, and the value of said ratio V is approximately 1.7 GPM/inch when the diameter D is approximately 0.60 inches.

26. A method for indicating flow of a fluid which flows at a rate within a range of flow rates having a flow rate $R_1$ as its lower limit, comprising the steps of:
providing a flow housing having defined therein a substantially cylindrical flow chamber, an inlet channel and an outlet channel, both said inlet channel and said outlet channel being in fluid communication with said flow chamber such that the fluid can flow through said inlet channel, said flow chamber and said outlet channel;
providing an impeller rotatably mounted within said flow chamber for rotation about a rotational axis;

choosing a nozzle plate, having a nozzle hole of a particular diameter D defined therein, on the basis of the diameter D of said nozzle hole, the particular diameter of said nozzle hole being determined in dependence on $R_1$, such that the higher the lower limit $R_1$ of the range of flow rates, the higher the value of D and the higher the value of a ratio $V = R_1 D$; and mounting said nozzle plate within one of said inlet and outlet channels.

* * * * *

UNITED STATES PATENT AND TRADEMARK OFFICE
CERTIFICATE OF CORRECTION

PATENT NO. : 5,099,699
DATED : March 31, 1992
INVENTOR(S) : Klaus KOBOLD

It is certified that error appears in the above-indentified patent and that said Letters Patent is hereby corrected as shown below:

In claim 1 (at line 54 of column 8), "ration V=$R_1$D" should read --ratio V=$R_1$/D--; and In claim 26 (at line 2 of column 12), "$R_1$D" should read --$R_1$/D--.

Signed and Sealed this

Seventeenth Day of October, 2000

Attest:

Q. TODD DICKINSON

*Attesting Officer*    *Director of Patents and Trademarks*